United States Patent [19]

Gilham

[11] Patent Number: 4,907,271
[45] Date of Patent: Mar. 6, 1990

[54] SECURE TRANSMISSION OF INFORMATION BETWEEN ELECTRONIC STATIONS

[75] Inventor: Dennis T. Gilham, Brentwood, United Kingdom

[73] Assignee: Alcatel Business Systems Limited, Romford, United Kingdom

[21] Appl. No.: 217,234

[22] Filed: Jul. 11, 1988

Related U.S. Application Data

[63] Continuation-in-part of Ser. No. 853,928, Apr. 21, 1986, Pat. No. 4,757,532.

[30] Foreign Application Priority Data

Apr. 19, 1985 [GB] United Kingdom ............... 8510096

[51] Int. Cl.⁴ .............................................. H04L 9/00
[52] U.S. Cl. ...................................... 380/25; 380/23; 380/21; 380/46; 380/50
[58] Field of Search .............................. 380/21, 23–25, 380/46, 50

[56] References Cited

U.S. PATENT DOCUMENTS

| | | | |
|---|---|---|---|
| 3,798,605 | 3/1974 | Feistel | 380/25 |
| 4,691,355 | 9/1987 | Wirstrom et al. | 380/23 |
| 4,723,284 | 2/1988 | Munck et al. | 380/25 |
| 4,757,532 | 7/1988 | Gilham | 380/23 |
| 4,775,246 | 10/1988 | Edelmann et al. | 380/23 |
| 4,780,828 | 10/1988 | Whisker | 380/23 |
| 4,799,061 | 1/1989 | Abraham et al. | 380/24 |
| 4,802,218 | 1/1989 | Wright et al. | 380/23 |
| 4,807,139 | 2/1989 | Liechti | 380/23 |

*Primary Examiner*—Salvatore Gangialosi
*Attorney, Agent, or Firm*—Shoemaker and Mattare, Ltd.

[57] ABSTRACT

An information transport system for conveying information between a franking meter machine and a Post Office equipment includes a unit having a non-volatile read/write memory which may consist of an EEPROM which can be transported between the meter and the equipment. When the unit is inserted in the franking machine a transaction code is verified by comparison with a registered code and information transfer is effected. The machine then generates a new code and stores it in a register. Upon return of the unit to the Post Office, the equipment responds to the transaction code stored in the unit to generate a new code corresponding to the new code generated and stored in the meter machine.

9 Claims, 9 Drawing Sheets

SECURE TRANSMISSION OF INFORMATION BETWEEN ELECTRONIC STATIONS

CROSS REFERENCE TO RELATED APPLICATION

This is a continuation-in-part of co-pending application Ser. No. 06/853,928, filed Apr. 21, 1986, now U.S. Pat. No. 4,747,532.

TECHNICAL FIELD

This invention relates to the secure transport, for example, by post, of information, such as franking machine credits and associated data, between electronic stations, such as a franking meter at one end and Post Office equipment at the other end. While the system is particularly described below in relation to a franking meter system it is obvious that the system can readily be adapted to other purposes for use by businesses, banks and so forth.

DESCRIPTION OF THE PRIOR ART

One of the limitations of normal franking machines from both the customer and the Post Office's point of view is the need to take the machine to a Post Office in order to have credit entered. The introduction of electronics has helped to reduce the weight of the machines but the time taken to obtain new credit is still much the same. In addition, the Post Office recording procedures are manual and must be re-handled to enter into a data processing system.

At present, two alternative systems available in the United Kingdom are the meter telephone resetting system and the value card system. The former makes use of the national telephone system for communication between the franking machine user and a computer data center. So far as the user is concerned, this has the disadvantages that in currently available mechanical franking meters a special attachment has to be mounted, it involves extra cost, the credit can only be updated by a preset amount, there is need to open a special bank account in conjunction with the suppliers of the system and there is no possibility of going, as an alternative, directly to the Post Office for recrediting. So far as the Post Office is concerned, there are the disadvantages that it receives the money from the supplier of the apparatus instead of from the users, while having no direct control of the complicated procedure or recorded information. The system involves large capital investment and high running costs requiring a large population of franking machine users to break even.

So far as the value card system is concerned, for the user it has the disadvantages of preset amounts of credit update and the necessity to surrender used value cards prior to the purchase of new cards. From the point of view of the Post Office, there is lack of scope for security enhancement, limited information available and incompatibility with a fully developed digital system. From the point of view of the manufacturer, there is the extra cost to print control information on the value card and the fact that the system is not universally accepted.

SUMMARY OF THE INVENTION

A main object of the present invention is to provide a franking machine system that involves substantially fewer disadvantages than the two aforesaid systems.

According to the invention, an information transport system comprises first and second stations each for electronically writing into and reading from a unit having an electronic circuit including a non-volatile read/write memory and connection means whereby binary encoded information can be written into and read from the memory at each of said stations, the information including an encoded transaction identity (TID code), and the unit being formed for mounting at each station with the connecting means in engagement with corresponding connecting means at the station, the first station being arranged to receive the unit with a first encoded TID and other information from the second station where a new TID code for the next transaction has already been generated within the second station and registered securely therein and the first station being further provided with means for decoding the first TID code and other information and independently generating a new TID code the same as that already registered in the second station and for revising the other information encoded in the unit, whereby when the unit is returned to the second station means therein can verify the new TID code by comparison with that already registered in the second station, the second station further being provided with means for revising said further information prior to the return of the unit to the first station. Advantageously, in each station the means for generating the next TID code may be a linear feed shift register (LFSR). In addition, each station may be furnished with means for decrypting the information received by way of the unit and encrypting the information sent by way of the unit, the decryption and encryption being by digital codes that are the same in each station. Means for adding and removing parity may be provided at each station to check for any errors. According to another aspect of the invention, an information transmission system comprises:

a communication link;
a first station including:
first connection means operatively connected to said communication link;
first storage means for storing a transaction code value;
transmission means operable to transmit a data block via the communication link to a second station connected to the communication link, said data block including information to be transmitted from said first station to said second station and the transaction code value stored in said first storage means;
said second station comprising:
second storage means for storing said transaction code value;
second data input means to receive said data block transmitted from the first station via said communication link;
second verifying means operable to verify the validity of the data block received from the communication link by said second data input means by comparing the transaction code value of said data block with said transaction code value stored in said second storage means;
said data input means being operative in response to said transaction code value of said data block being equal to said transaction code value stored in said second storage means to transmit a second data block via the communication link to the first station, said second data block comprising further information for transmission from the second station to the first station and said transaction code value;

a second generator operative to generate a new value of transaction code and subsequent to transmission of said second data block to store said new value in said second storage means; and said first station further including:

data receiving means operative to receive the second data block from the second station via the communication link;

first verifying means operable to verify the validity of the data block received by said data receiving means by comparing the value of the transaction code of the second data block with the value in said first storage means;

a first transaction code generator operable to generate said new value of transaction code and to store said new value in said first storage means.

The invention also includes a method of transmitting information between first and second stations including the steps of:

providing a communication link between said first and second station;

storing a transaction code value at each of said first and second stations;

transmitting from the first station a first data block comprising first information and said stored value of transaction code via the communication link to the second station;

receiving the first data block from the first station via the communication link at the second station;

verifying validity of said first data block by comparing the transaction code value in the first data block with the value stored at said second station;

transmitting from the second station a second data block comprising second information and said transaction code value and generating and storing a new transaction code value at the second station in response to said first data block being valid;

receiving the second data block from the second station via the communication link at the first station;

verifying validity of said second data block by comparing the transaction code value in the second data block with the value stored at the first station; and generating and storing the new transaction code value at the first station in response to said second data block being valid.

BRIEF DESCRIPTION OF THE DRAWINGS

In order that the invention may be clearly understood and readily carried into effect, a postage meter credit resetting system will now be described, by way of example, with reference to the accompanying drawings, in which.

DESCRIPTION OF PREFERRED EMBODIMENT

The plug-in unit 18 of FIG. 1 when ready to be used by a subscriber is delivered, for example, by post, from a Post Office with a recorded credit update and other information described below registered in an electronically erasable programmable memory a form of non-volatile read/write memory. The unit 18 is plugged into a franking meter 19 (FIG. 3) for the registered credit update and other data to be transferred to the franking meter. This franking meter is substantially as described in patent specification GB 2,079,223 but modified as described below to accept the plug-in unit. Then, at an appropriate time, the plug-in unit can be sent back for insertion in the Post Office equipment with various data derived from registers in the franking meter to be registered in the equipment. The credit and other data carried by the unit can then be updated and the unit thereupon sent again for insertion in the franking meter.

Figure 1:
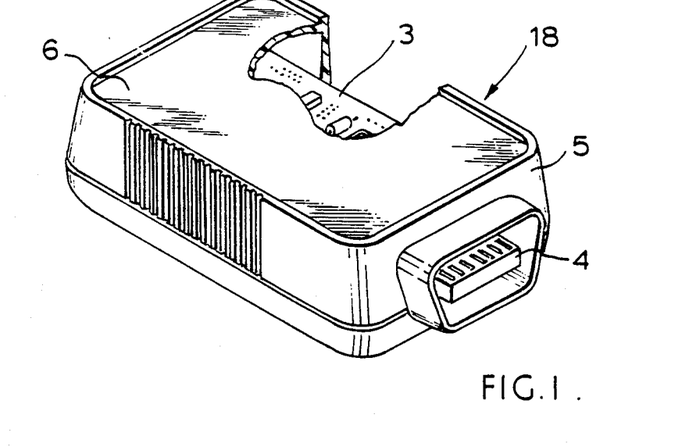
FIG. 1 is a perspective view of a plug-in credit transfer unit for use in a postal franking system.
Figure 2:
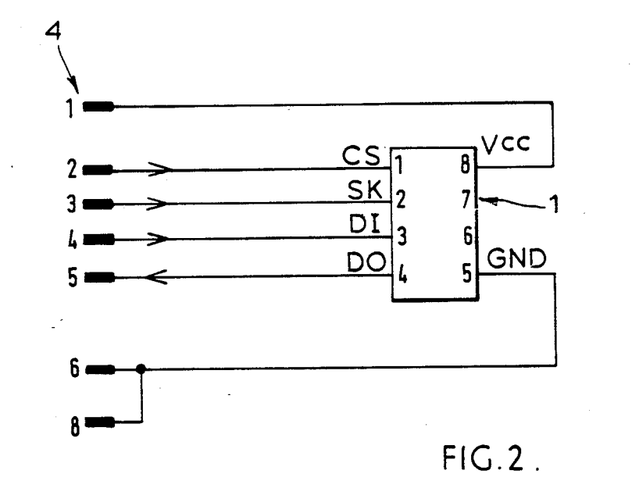
FIG. 2 is a basic electrical circuit diagram including the unit of FIG. 1.

As shown in FIGS. 1 and 2, the electronic elements constituting and associated with the memory are mounted on a printed circuit board 3, the electronic signals being carried to a plug-in connector 4. The electronic elements are contained in a housing 5 of plastics alternatively of metallic materials which are invisibly secured. The dimensions of the housing (length x width x height) are typically 70×45×15 mm. Surfaces 6 are formed at the top and bottom of the housing to allow labels to be adhered for addressing to the Post Office and returning to the subscriber.

As shown in FIG. 2, the non-volatile memory 1 consists of a National 16×16 bit EEPROM (electrically erasable programmable read only memory) type NMC 9306N which allows data to be transferred serially. Although the number of data writes to an EEPROM is limited to about ten thousand, if the plug-in unit is used as frequently as once per week and assuming only one write to each memory location in a transaction this would still exceed the life of the plug-in unit. Also, data is retained in the memory with no power applied for over ten years. Memories having a greater density than 16×16 bits can readily be used, if need be, when these become commercially available.

The serial nature of the chosen EEPROM allows the franking meter to be provided with an interface for the plug-in unit to be used which has a minimum number of connections. This reduces the amount of circuitry in the franking meter and increases the security of the data in the plug-in unit because no address or data line is directly accessible to the connector. The signals (FIG. 2) required for the memory, in addition to a 5 volts supply and ground connection, are a chip selects CS signal for selecting the memory, a serial clock SK, a data-in DI signal, the data being clocked in synchronism with the serial clock and containing address, mode of operation and data to be store, and a data-out DO signal. Once the address is clocked into the data-in connection, the data to be read is clocked out in synchronism with the serial clock.

Although this type of memory only requires six connections, a 14-way connector is used as this simplifies the design of the franking meter when considering future accessories. The chosen connector can be used for greater than one thousand insertions before its performance deteriorates significantly. This is adequate for the franking meter and plug-in unit itself. However, as the Post Office equipment could accept several plug-in units in one day, the number of insertions can need to be much greater, so other connectors for example zero-insertion force types can with advantage alternatively be used.

It will be appreciated that the plug-in unit is conditioned by the Post Office equipment always to be associated with one franking meter only. It is under power when connected to that franking meter or to the Post Office equipment. The plug-in unit is conditioned so that it cannot be used with any other franking meter whilst in service with its own meter and once the franking meter has been updated with credit, the plug-in unit cannot be reused until reset with fresh credit and the conditioning is also updated by the Post Office equipment. Thus mere duplication of the plug-in unit and its contents is of no value in an attempted fraud. Also a suitably obscure code is used, as described below, to prevent alteration of the credit or reuse of the credit after the franking machine has been updated. The franking machine and Post Office equipment are arranged so that data loss or corruption can be detected either at the franking meter or at the Post Office equipment.

Figure 3:
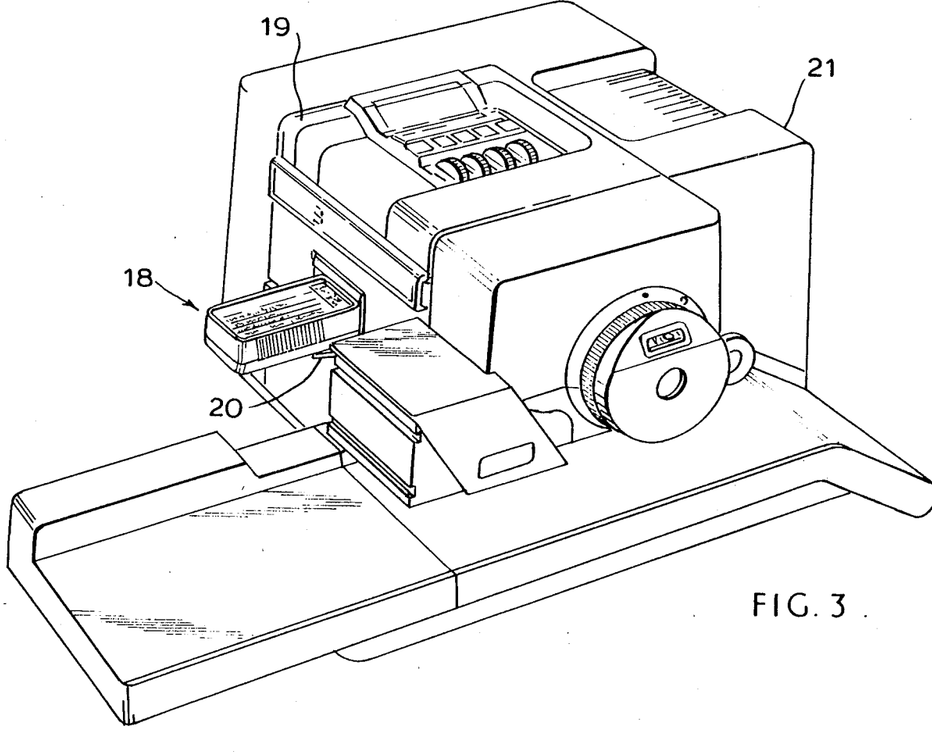
FIG. 3 is a perspective view of a franking meter with the unit of FIG. 1 mounted thereon.

Referring to FIG. 3, when the plug-in unit 18 is removed from the franking meter 19, a hinged door 20 springs up to cover the connector in the franking meter to give it mechanical protection. The connector in the franking meter is soldered directly to an interface printed circuit board described below. This, in turn, is positioned between the connector side of the franking meter and an internal control printed circuit board for controlling the franking meter. A cable carries the signals from the interface printed circuit board to a connector on a display printed circuit board in the franking meter. A microprocessor on the control printed circuit board is connected directly to the connector on the display printed circuit board.

Figure 4:
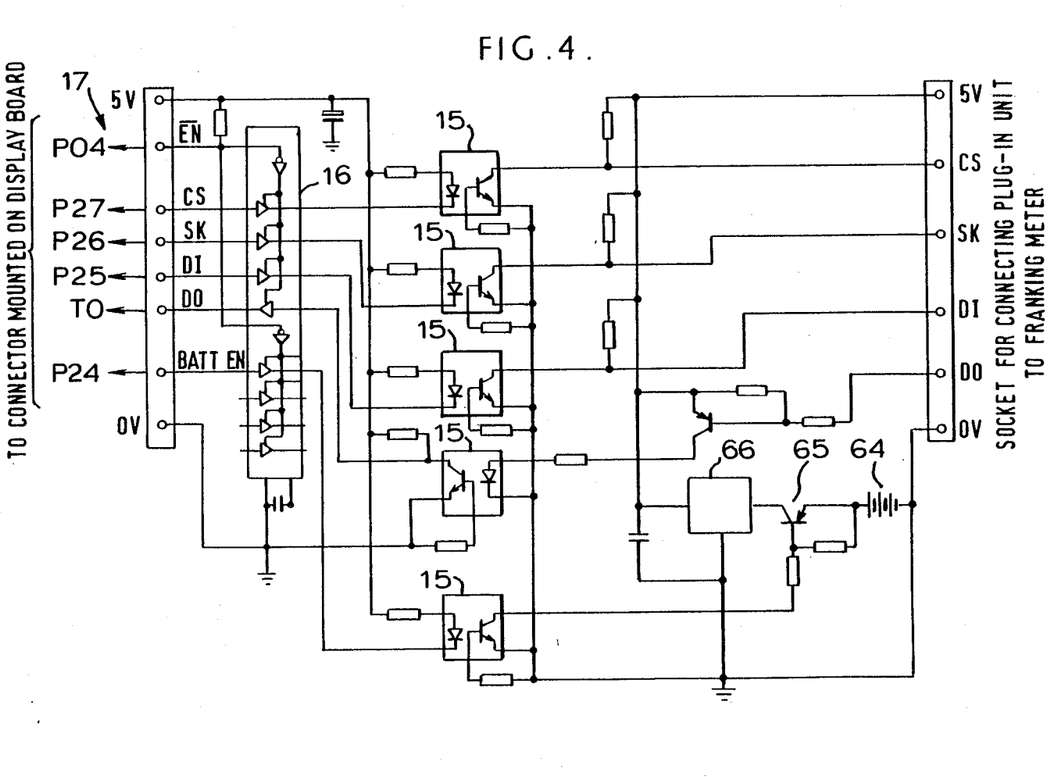
FIG. 4 is a diagram of an interface circuit in the franking meter of FIG. 3 for receiving the unit of FIG. 1.

The arrangement of the interface printed circuit board is shown in FIG. 4, the connector for the plug-in unit being shown on the right hand side of this Figure. The main function of the interface is to form electrical isolation between the franking meter circuit and the plug-in unit's memory. This is done by means of optical isolators 15 (type 4N25), in the four main signal paths: chip select (CS); serial clock (SK); data in (DI) and data out (DO) thereby providing protection against high electrical voltages applied externally at connector 2 contained in the franking meter. Each path also has a Schmitt Trigger buffer with tri-state output 16 (type 74LS244), in order to buffer the microprocessor ports in the franking meter to the optical isolators, and an enable signal ($\overline{EN}$ is provided to enable these buffers when the plug-in unit's memory is to be accessed. The four signals and enable are connected directly to a group 17 of microprocessor ports P27, P26, P25, TO and P04, as shown in FIG. 4 protection against erroneous access to the memories contained in the franking meter is provided by the secure logic control of the microprocessor as described below.

The four signals are under software control, and enable data to be transferred to and from the plug-in unit's memory by means of the DI and DO signals. These serial signals are synchronized to the falling edges of the clock SK pulses, and the plug-in unit's memory is enabled when CS is high. Before a read or write, at least one instruction must be sent to the memory via DI, containing 9 bits (synchronized to SK). The instructions are Read, Write, Erase Register, Erase/-Write Enable, Erase/Write Disable and Erase All Registers, and the first three instructions use four of the 9 bits to address one of the 16 bit words.

To read from the plug-in unit's memory, a Read instruction is first input on the DI line, (specifying a 16 bit register) and the next 16 SK pulses clock the data out of the DO line. To write to the memory, it is first necessary to send an Erase/Write Enable instruction on the DI line, followed by Erase Register instruction (specifying a 16 bit register), followed by a Write instruction, (specifying the same register). During the next 16 SK pulses, data is input on the DI line, and this may be followed by an Erase/Write Disable instruction in order to protect against further erasures or writes. The complete memory may be erased by means of the Erase All Registers instruction provided it is preceded by an Erase/Write Enable instruction.

As the plug-in unit's memory is powered by means of volts when plugged into the franking meter, this implies that a 5 volt signal must be provided on the meter connector for the plug-in unit. All signals on this connector are exposed to the user, so if this 5 volts is the same as the internal supply voltage, it is conceivable that damage could be done to the existing hardware in the franking meter either by accidentally or (in the case of fraudulent attempts) deliberately applying high voltages to the connector. Whereas the signal paths are protected by the optical isolators, the supply cannot be protected in this way. Therefore, referring to FIG. 4 which shows the circuit of the franking meter interface to the plug-in unit (trade designations and electrical values of certain of the elements being indicated in this figure) an independent lithium cell 64 is used to power the plug-in unit's memory (only when the plug-in unit is inserted), via a regulator 66. A transistor 65 provides a means of switching the battery power on and off under software control, that is, when data is to be transferred to or from the plug-in unit for which the battery is switched on. The battery is turned off at all other times. This maximizes the battery life which is estimated to be in excess of 10 years. The base of the switching transistor is connected to the microprocessor in a similar manner to the four signals described above, that is, via a fifth optical isolator 15, or Schmitt Trigger buffer 16 and finally to the microprocessor part P24 of the group 17. 20 Another modification of the aforesaid franking meter of GB 2,079,223 to accommodate the plug-in unit is the replacement of the microprocessor which contains 2K bytes of ROM and 128 bytes of RAM by a microprocessor having twice the memory density, for example, Intel's 8050 with 25 4K bytes of ROM and 256 bytes of RAM.

The ranges available for the various functions in the memory of the plug-in unit are 40 (minimum 28) bits for the credit c, 40 bits for the tote t, 40 (minimum 28) bits for the items i, 32 bits for the transaction identification code TID (encrypted), 32 bits for the credit update $\Delta C$ (encrypted), 8 bits for the status (including fault condition), a maximum of 40 bits for parity and 16 bits for plug-in unit identification. A maximum of 248 bits is, therefore, required. It should be explained that tote t is the total value accumulated by the franking meter, items i is the total number of mail items that have been franked by the franking meter. Status refers to the state of the unit at any instant during its cycle of operation. Parity may be of the type described with reference to Table 3 in the said GB 2,079,223.

Figure 5:
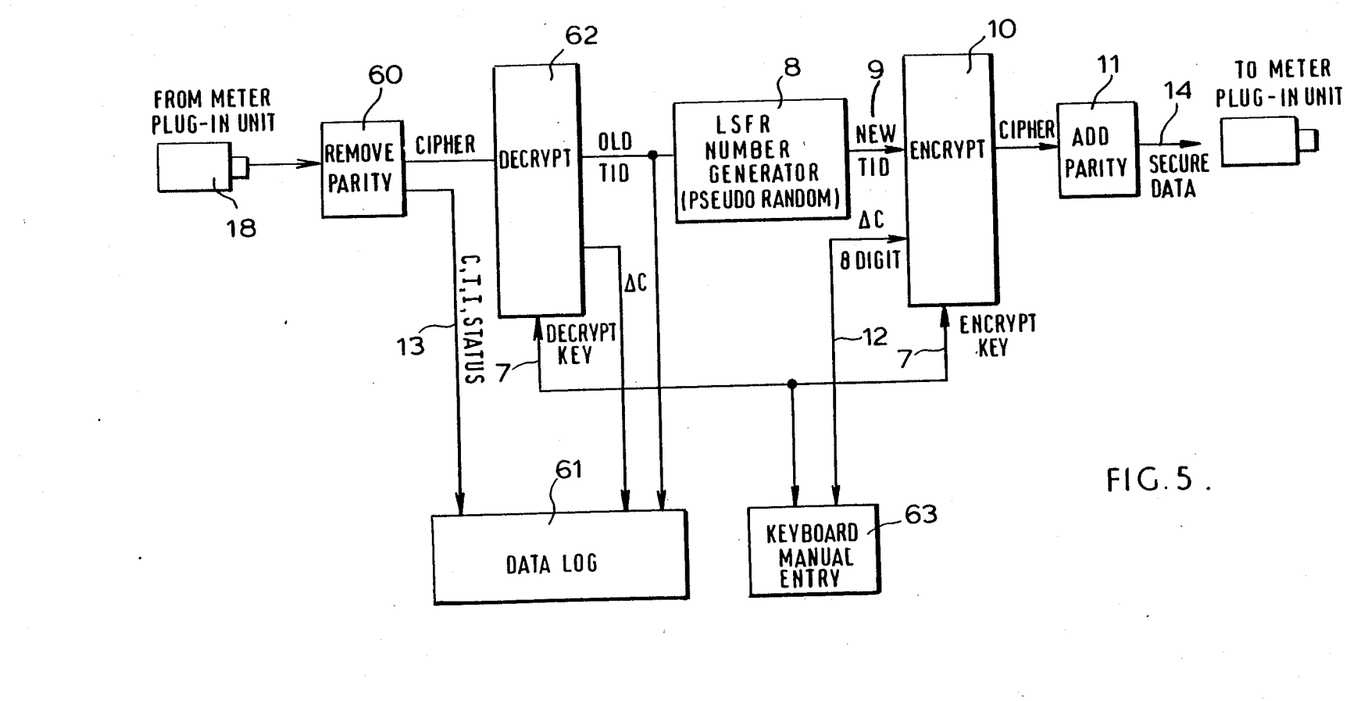
FIG. 5 is a block diagram of Post Office equipment protocol for accepting the unit of FIG. 1 and reading and writing therein credit and associated data.

The Post Office equipment protocol will now be described with reference to FIG. 5. This equipment is a modification of that used for the aforesaid meter of GB 2,079,223 when required to access the meter registers direct. When the plug-in unit 18 is mounted into the Post Office equipment, data in the plug-in unit's memory is transferred to the Post Office equipment where parity bits are removed 60 and the status is checked so that, if there are no faults, the credit, tote and items data 13 are fed to a data log 61 for record keeping purposes (e.g. for later transfer to printer, terminal or disc).

The encrypted TID code and credit update, $\Delta C$ both with parity removed pass from the remove parity module 60 to a decryption coding module 62 where this transaction identification code is decrypted using an eight digit Post Office code 7 peculiar to a given franking meter fed from a keyboard 63. This used TID code together with the used credit update $\Delta C$ (decrypted) are fed to the data log 61. The used TID code then passes to a linear feed shift register LFSR 8 which is a 24 bit ($16 \times 10^6$ states) pseudo random number generator which changes the transaction identification to a new TID code 9. This code is changed in this way at the start of every transaction and ensures that the plug-in unit cannot be reused until fresh credit is bought and ensures that the plug-in unit cannot be used with any other franking meter by virtue of the fact that the non-volatile RAM in the franking meter stores data peculiar to that meter by way of the Post Office code. The size of the LFSR need only be such as to minimize the probability of fraud by writing random codes into the plug-in unit and as 24 bits give a probability of approximately 1 in $16 \times 10^6$ this size is considered adequate.

The new TID code 9 together with the new credit update $\Delta C$, pass to an encryption coding module 10 where the data block thus formed is encrypted using the 8 digit Post Office coding 7 previously entered at the keyboard 63. A standard encryption coding is used, such as the F.I.P.S. data encryption standard. The data encryption standard has to be high enough to prevent the data in the plug-in unit from being altered or extracted by fraudulent intent. A check is provided to ensure that the new credit update $\Delta C$ is within specific upper and lower limits.

The signal output from the encryption coding module 10 goes to an error coding module 11 which is a single cross-parity error detection system, where up to three zeros in a data block are detected. This is adequate for recording the encrypted TID and credit codes. Probability against fraud has already been ensured by an adequate number of bits in LFSR so that a high level of error coding would serve no further purpose.

The output 14 from the error coding module 11 is fed to the plug-in unit which is then posted to the user who inserts it into his meter. The franking meter reads and verifies both the new TID code and the new credit update. The franking meter decrypts the TID code and compares it with the expected value, stored in the meter. If the values disagree, an error condition is set up and a limited number of repeat entry attempts are allowed. If the values agree the franking meter writes the current values of credit, tote, items and status to the plug-in unit and verifies the transfer. Finally, the updated credit and the next TID code generated by a LFSR acting similarly to that in the Post Office equipment are registered in the franking machine. This new TID code is not passed on to the plug-in unit which receives the same new code when it gets to the Post Office equipment later to be compared with the new code already registered in the franking machine.

The protocol described above has been designed to maintain a high level of security against fraudulent attempts, even assuming the possibility of accessing data in the plug-in unit's memory. However, should a fraudulent attempt also involve breaking the seals of the franking machine in order to gain access to the software program stored in the microprocessor, and assuming a disassembly of the code is possible, all security for transactions on other machines rests on knowledge of the Post Office code, as this is the only "unknown" that is different for all meters. Let the Post Office code be an 8-digit number, then assuming the user is allowed up to 50 attempts of entering credit, the probability of determining this code is 1 in $2 \times 10^6$. The Post Office may request a 6-digit code in order to make this system compatible with other available systems, but the protocol will allow up to an 8-digit Post Office code.

Figure 6:
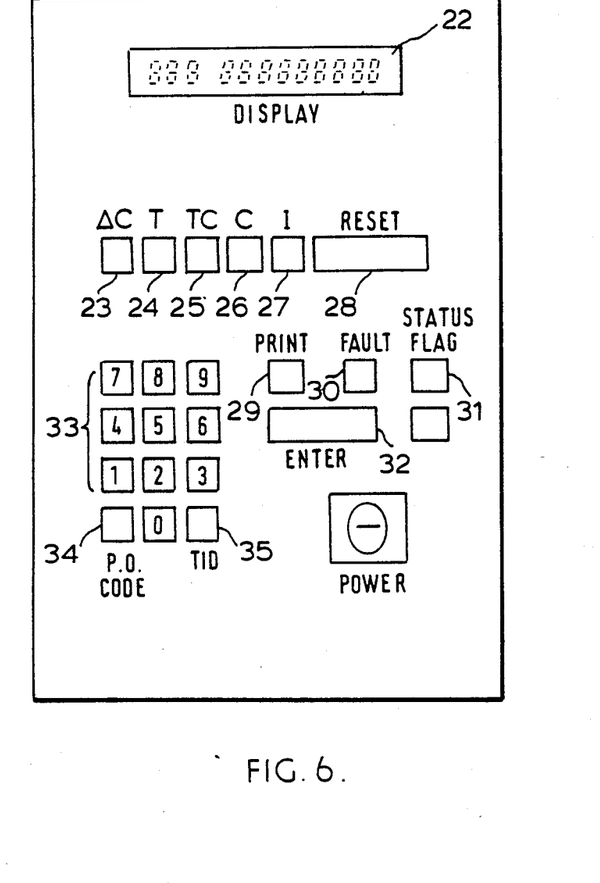
FIG. 6 is a plan of a front panel in Post Office equipment such as that of FIG. 5.

FIG. 6 is a schematic diagram of a front panel layout suitable for one form of the Post Office equipment. It consists of a row of 12 seven-segment displays 22 and a set of push buttons 23–35, labelled as shown. When the plug-in unit is inserted, selection of "T", "TC", "C" or "I" 24–27 displays, either Tote, Tote+Credit, Credit or Item registers (respectively), as read from the plug-in unit. The initial value of TID can be input to the plug-in unit by means of selecting "TID" 35 followed by the required value on the numeric keyboard 33 followed by "Enter" 32. The Post Office code can be entered by selecting "P.O. Code" 34 followed by the required value, followed by "enter", and similarly the Credit Update can be entered by initiating the sequent with "$\Delta C$" 23. Similarly, should it be necessary to update Tote, Credit or Items within the plug-in unit, this can be done by pressing T, C or I (respectively) followed by "Reset" 28 followed by the required value, followed by "Enter". The Status Flags can be displayed by selecting "Status Flag" 31 and may be altered by following the selection with "Reset", new value and "Enter". Selection of "Print" 29 causes all the data in the plug-in unit to be transferred to the printer interface.

It is possible to connect a terminal and data storage medium and to display the data on the terminal's visual display unit VDU, and to transfer, if desired, to a disc, be means of commands input via the terminal's keyboard. When the plug-in unit is first plugged into Post Office equipment, the software checks the parity and data for errors, and if any errors have occurred, the display indicates a fault condition. It is possible to attempt data retrieval by selecting "Reset" followed by "Fault" 30 and the result will be indicated on the display.

Figure 7:
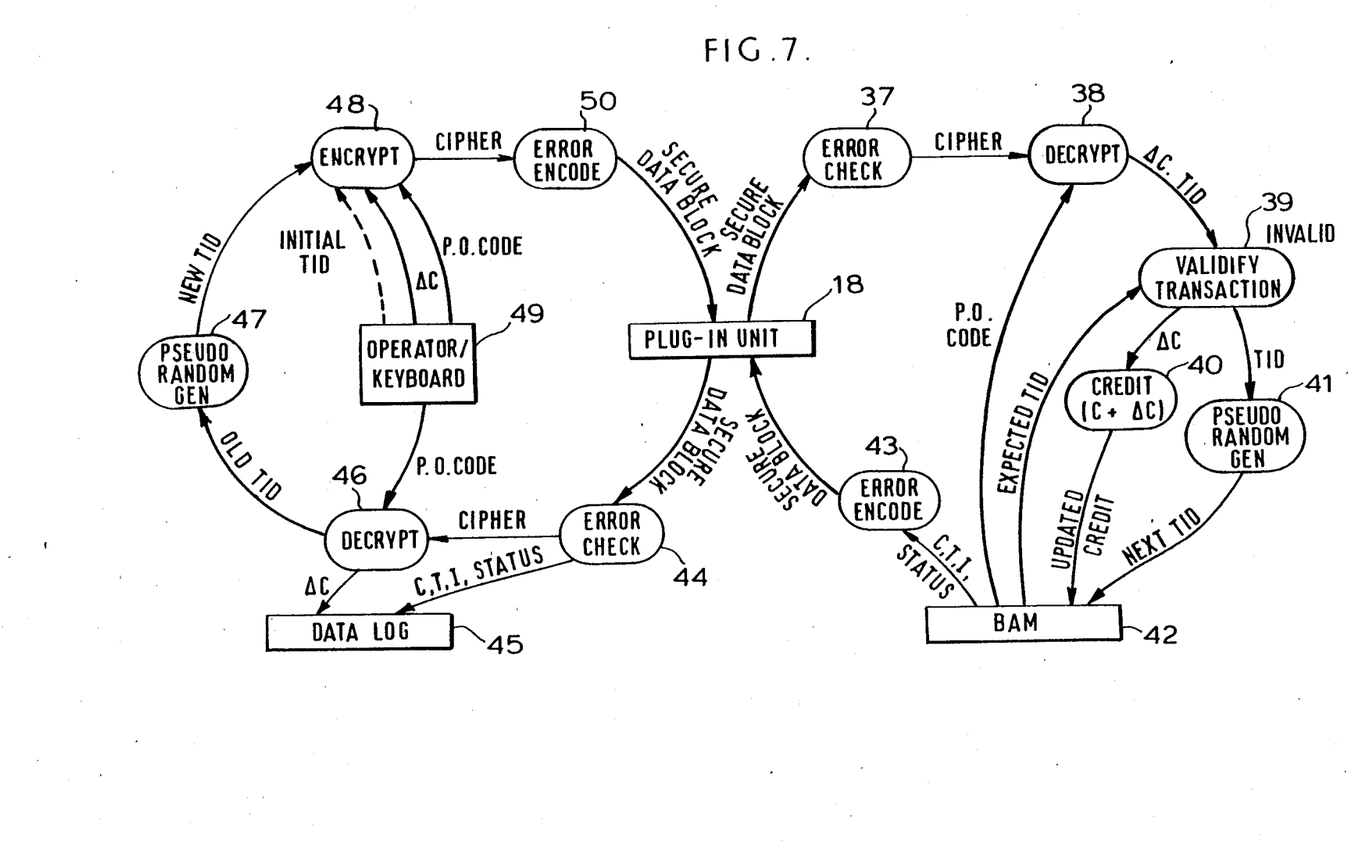
FIG. 7 is a schematic diagram showing the arrangement of software used in the franking meter of FIG. 3 and the Post Office equipment of FIG. 5.

The software for the system will now be described with reference to FIG. 7. The majority of the existing software for the operation of the franking meter described in the aforesaid GB 2,079,223 remains intact and the routines needed for the plug-in unit 18 are additional.

When the plug-in unit 18 is inserted into the meter, the user may select the keys "CL" simultaneously with "C" after which insertion is detected by reading a defined plug-in unit's memory address which has some known constant data stored. Absence of this data returns the software to the standard meter routines, but when presence is detected the remaining data is read from the plug-in unit and parity is checked for errors 37. If an error occurs, the software returns to the standard meter routine, but correct data is indicated by the sign cPAc on the display followed by the credit update ΔC, unless the credit has been used in which case zero is displayed.

If the user now wishes to transfer the credit to the meter he selects the "upper function" key simultaneously with "C", when the plug-in unit's data is read again, and checked for errors, as before. Again, the software returns to the meter routines if an error is detected, otherwise the encrypted TID code and ΔC are combined with the P.O. code stored in the franking meter 42 to form the decrypted TID code and ΔC 38. The expected TID (stored in the franking meter) is compared with the TID just derived, and if different, the transaction is terminated 39. This condition will be flagged on the display, and if on repeating the transaction the condition is reproduced, the plug-in unit will have to be returned to the Post Office for checking on the Post Office equipment.

On successful comparison, it is now possible to:

(a) Update the credit register by the amount ΔC 40 and store it in a store 42 which is a battery energized RAM.

(b) Generate a new TID by applying a LFSR (linear feed shift register) 41 similar to that in the Post Office equipment and storing the new TID in the store 42.

(c) Transfer error encoded Credit, Tote, Items and status to the plug-in unit 18 verifying that the data has been written correctly 43.

The completed transaction is now indicated by displaying the new credit. The plug-in unit may now be removed, and the software returns to the operation of the meter once the user selects "CL" As a precaution, it will be necessary to set a flag on completion of each of the stages (a), (b) and (c), such that if power should fail during a transaction, a later attempt will enable the software to jump to the start of the stage that was interrupted.

The Post Office equipment detects the presence of a plug-in unit 18 in the same way as described above, that is by detecting the known constant stored in the plug-in unit's memory. All data is read from the plug-in unit and parity is checked for errors 44. An error will be flagged on the display and, as indicated above, the operator can attempt to retrieve the data that was found in error by selecting "Reset" followed by "Fault".

From the display, it is possible to determine if the fault is reset. Whether a fault occurs or not, it is possible, at this stage, to log all the plug-in unit's data on a printer by selecting "Print" 45.

If no errors are detected, the encrypted TID code is combined with the Post Office code (when entered at the keyboard 49) to form the decrypted "old TID" 46. From this, a "new TID" can be generated by applying the LFSR 43 as described above. If the transaction is the first for the given plug-in unit, the old TID code does not exist, in which case the software will expect a value to be entered at the keyboard 49, this "initial TID" in fact replaces the "new TID". The constant used for detection of the plug-in unit in the franking machine or Post Office equipment can now be written in the plug-in unit's memory.

The required credit update ΔC is now entered on the keyboard 49 and is combined with the new TID code just formed and the Post Office code previously entered to perform the encryption algorithm 48. Finally, the encrypted TID Code and ΔC is error encoded 50 before being transferred to the plug-in unit's memory 36 and the transfer verified. Completion is indicated on the display.

In the event of a misplaced plug-in unit, the current TID code (which can be calculated from the Post Office's records of the old TID code) can be input to a replacement plug-in unit as though it is new, that is treated as an "Initial TID".

Figure 8:
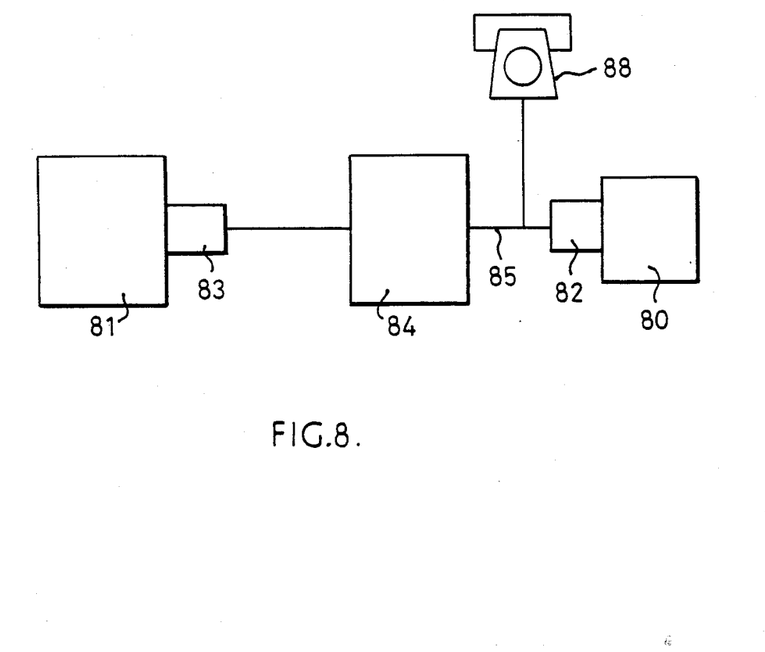
FIG. 8 is a diagram showing a franking meter connected by a communications link to a Post Office equipment.

It will be appreciated that the plug-in unit's non-volatile memory could take the form of an embedded chip with a corresponding array of accessible connections and the housing take the form of a plastic card. "Instead of utilizing a transportable module 18 which is pluggable into the franking meter 19 and into the Post Office equipment and is physically transported therebetween for the transfer of data between the franking meter and the Post Office equipment, the data may be transferred by means of a communications link such as is provided, for example, by a telephone system. This is shown in FIG. 8 in which a franking meter 80 and Post Office equipment 81 are each connected by means of modems 82, 83 respectively to a telephone system 84. Conveniently, the modem 82 connecting the franking meter to the telephone system is of miniature construction comprising a module, similar in physical form to that of the transportable module, with a connector integral therewith so that the modem 82 can be plugged directly into the socket of the franking meter. The modem 82 is provided with a flexible lead 85 to connect the modem to the telephone system 84. Alternatively, the modem may be integrated into the franking meter and consist of electronic circuits housed within the housing of the meter. Also, the modem may be a free standing unit with a connector on the end of a lead for plugging into the socket of the franking meter. The modem 82 is provided with data input and output connections and with a ground connection on its connector. The data output connection of the modem connects to the data input connection DI of the franking meter, the data input connection of the modem connects to the data output connection DO of the franking meter and the ground connection of the modem connects to the ground connection OV of the franking meter. If desired, the socket of the franking meter and the connector of the modem may be provided with additional contacts to enable signals other than data signals to be passed between the modem and the franking meter. Such signals may comprise clock signals and control signals utilized in the transfer of data signals between the modem and the franking meter. The modem 82 may be powered by its own power supply which may be energized by the main electricity supply or battery or the modem may derive power for its operation from the 5 volt supply provided by the battery 64 (FIG. 4) of the interface circuit of the franking meter. The modem 82 may have an autodial facility and the franking meter be provided with a non-volatile storage location to store the telephone number for connection to the Post Office equipment whereby communication from the franking meter to the Post Office equipment may be effected automatically by the meter and modem. If the modem does not have an autodial facility, an operator of the meter desiring to communicate with the Post Office equipment utilizes a telephone handset 88 to establish communication by dialling the telephone number and, upon receipt of an answer tone, then replacing the telephone receiver in its cradle.

When an operator of the franking meter requires an update of credit for use in franking operations of the meter, the operator uses the keyboard to select remote mode operation of the franking meter and enters the amount of credit update required. Communication with the Post Office equipment is established by the operator as hereinbefore described and a payment request signal, including the desired value of credit update, is transmitted by franking meter to the Post Office equipment. Upon receipt of the payment request signal, the Post Office equipment reads, by remote command, the license number (SER) or other identification of the meter from a storage location of the meter and loads, from its store or data log, a record file corresponding to that license number or identification. This record file includes, for example as a header, an encryption and decryption key for use uniquely for that particular meter.

Figure 9:
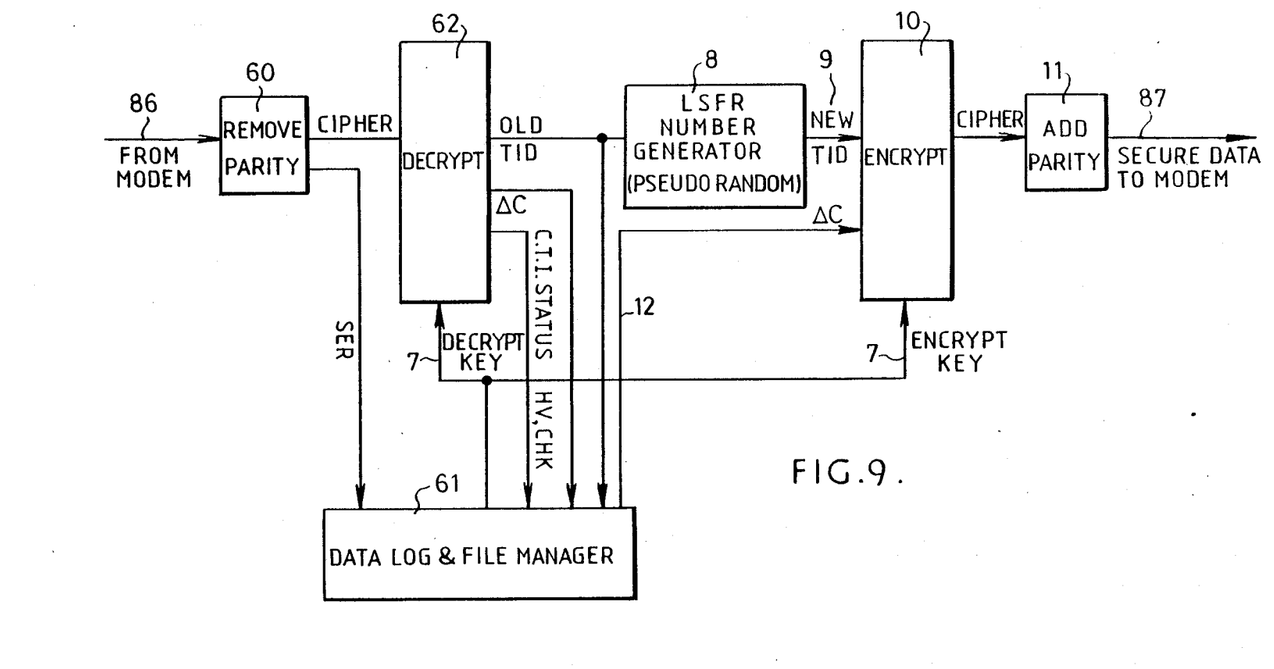
FIG. 9 is a block diagram of Post Office equipment for receiving information from and transmitting credit updating information to a franking meter via a communication link.

The operation of the Post Office equipment is illustrated in FIG. 9. It is similar to that illustrated in FIG. 5 and, accordingly, the same references are used for items common to both FIG. 5 and 9. Firstly the Post Office equipment reads the meter registers by remote command. This corresponds to the reading of the registers, storing the values as a secure data block in memory of the module and then reading secure data block from the module into the Post Office equipment. The secure data block includes a transaction identification code (TID) which is unique to that particular meter and to that transaction between the meter and Post Office equipment. The transaction code is stored in a non-volatile storage location in the franking meter. The data read from the registers of the meter includes credit (C), tote (T), item count (I), high value items (HV) and a check sum (CHK), the latter being utilized to check correct receipt of the data. The secure data block is received on data input line 86 from the modem 83 and as described hereinbefore, the Post Office equipment carries out an error check on the received secure data block and, after decryption using the decryption key from the record file, verifies that the transaction code in the secure data block is the same as the transaction code stored in the Post Office equipment for that franking meter. If the transaction codes compare, the received data is utilized to update the data in the loaded record file. The Post Office equipment combines the amount of the credit update with the transaction identification code and encrypts it into a further secure data block consisting of a crediting message. This crediting message is transmitted on data output line 87 to the modem 83 and thence to the meter. When the meter receives the crediting message, it decrypts the secure data block and compares the expected transaction identification code stored in the memory of the meter with the transaction identification code received in the secure data block. If these codes are equal, the meter adds the credit update amount received in the data block to the credit register of the meter. The pseudo-random number generator of the meter generates a new transaction identification code and stores this in memory for use in the next transaction with the Post Office equipment.

Figure 10:
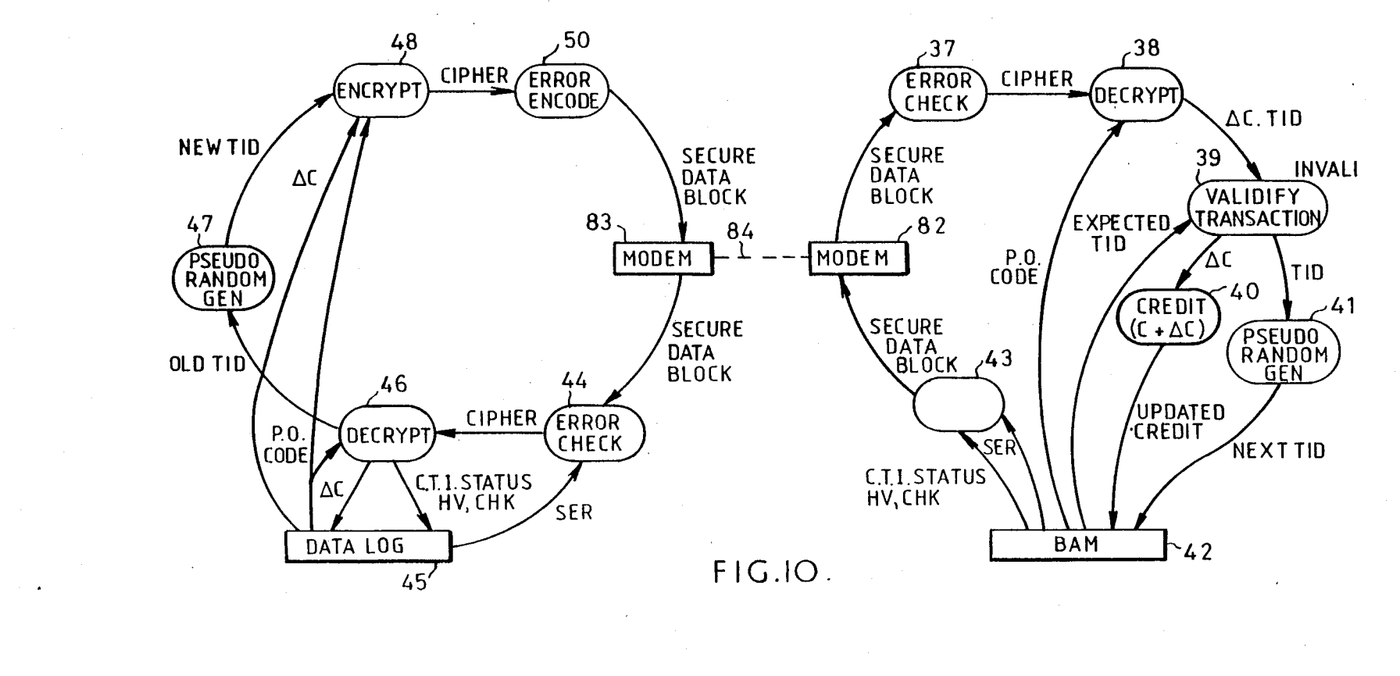
FIG. 10 is a schematic diagram showing the operations effected under the control of software in a franking meter and Post Office equipment.

The transfer of secure data between the franking meter 80 and Post Office equipment 81 and the handling of the data by the meter and the Post Office equipment is illustrated in FIG. 10. This is effected in a manner similar to that shown in FIG. 7 in relation to transfer of data by a physically transported module and the same references are used for items common to both FIG. 7 and FIG. 10. As will be seen, the plug-in unit has been replaced by modems 82, 83 and a communication system 84 otherwise the handling of the secure data by the franking meter and the Post Office equipment is similar. Accordingly it is considered that the operations illustrated in FIG. 10 can be understood easily by reference to the description relating to FIG. 7. Therefore it is considered to be unnecessary to make detailed reference to FIG. 10. However, in FIGS. 9 and 10 the identification (SER) of the meter is transmitted from the meter, in un-encrypted form, to enable the encryption and decryption key to be read from the record file in the data log instead of entering the key on the keyboard. Also the data (C, T, I, Status, HV, CHK) read from the registers of the meter is transmitted in encrypted form to provide additional security of the data.

The Post Office equipment may be arranged not to send the crediting message in certain circumstances, for example, when the operator requests a credit update amount in excess of a predetermined value.

After the credit register of the meter has been updated with the credit update amount, the operator returns the meter to normal meter operation by appropriate input on the keyboard. Upon completion of the credit updating transaction, the Post Office equipment generates and stores a new transaction identification code corresponding to that generated and stored in the franking meter and the record file for that meter is down loaded to await the next credit updating transaction for that meter.

I claim:

1. An information transmission system comprising:
a first station;
a second station;
a communication connection interconnecting said first and second stations during transmission of data therebetween; said first station including:
first connection means operatively connected to said communication connection;
first storage means for storing a transaction code value;
transmission means operable to transmit a data block via the communication connection to said second station connected to the communication connection, said data block including information to be transmitted from said first station to said second station and the transaction code value stored in said first storage means;
said second station comprising:
second storage means for storing said transaction code value; second data input means to receive said data block transmitted from the first station via said communication connection;
second verifying means operable to verify the validity of the data block received from the communication connection by said second data input means by comparing the transaction code value of said data block with said transaction code value stored in said second storage means;

said data input means being operative in response to said transaction code value of said data block being equal to said transaction code value stored in said second storage means to transmit a second data block via the communication connection to the first station, said second data block comprising further information for transmission from the second station to the first station and said transaction code value;

a second generator operative to generate a new value of transaction code and subsequent to transmission of said second data block to store said new value in said second storage means; and said first station further including:

data receiving means operative to receive the second data block from the second station via the communication connection;

first verifying means operable to verify the validity of the data block received by said data receiving means by comparing the value of the transaction code of the second data block with the value in said first storage means;

a first transaction code generator operable to generate said new value of transaction code and to store said new value in said first storage means.

2. An information transmission system as claimed in claim 1 wherein said first station includes means to encrypt the first data block prior to transmitting the first data block to the second station; means to decrypt the second data block upon receipt thereof from the second station; and wherein the second station includes means to encrypt the second data block prior to transmitting the second data block to the first station; and means to decrypt the first data block upon receipt thereof from the first station.

3. An information transport system as claimed in claim 1 wherein said second station is connected to the communication connection by a modem and wherein said second station includes a battery and switch means operative during transmission and receiving of data to and from the communication connection to connect the battery to the modem to power said modem.

4. An information transmission system as claimed in claim wherein said second station is a postal franking machine including a descending register to register a value of credit available for franking operations; an ascending register to register an accumulated value of franking effected; and wherein the first information relates to a value of credit update and the second information relates to values registered in said descending and ascending registers.

5. An information transmission system as claimed in claim 4 wherein said first station is a postal authority center.

6. An information transmission system as claimed in claim 1 wherein said first and second generators for generating the new transaction code value each include a linear feed shift register.

7. A method of transmitting information between first and second stations including the steps of:

providing a communication connection interconnecting said first and second stations during transmission of information between said first and second stations;

storing a transaction code value at each of said first and second stations;

transmitting from the first station a first data block comprising first information and said stored value of transaction code via the communication connection to the second station;

receiving the first data block from the first station via the communication connection at the second station;

verifying validity of said first data block by comparing the transaction code value in the first data block with the value stored at said second station;

transmitting from the second station a second data block comprising second information and said transaction code value and generating and storing a new transaction code value at the second station in response to said first data block being valid;

receiving the second data block from the second station via the communication connection at the first station; verifying validity of said second data block by comparing the transaction code value in the second data block with the value stored at the first station;

and generating and storing the new transaction code value at the first station in response to said second data block being valid.

8. A method as claimed in claim 7 including the steps of encrypting the first data block prior to transmission thereof from said first station; decrypting said first data block upon receipt thereof by the second station; encrypting the second data block prior to transmission thereof from the second station and decrypting the second data block upon receipt thereof at the first station.

9. A method of updating a credit value stored in a credit register in a franking meter located remotely from post office credit updating equipment including the steps of:

providing a communication connection interconnecting said franking meter and said post office equipment;

storing a transaction code value in said franking meter and in said post office equipment; transmitting from the franking meter via the communication connection to the post office equipment a credit updating message including an indication of a selected variable credit update value;

transmitting from the post office equipment a signal effective to read register data from registers in the franking meter and to form a first secure data block comprising said register data and the transaction code value stored in the franking meter; transmitting said first secure data block from the franking meter to the post office equipment via the communications connection; receiving the first secure data block at said post office equipment;

verifying validity of said received first secure data block by comparing the transaction code value in the first secure data block with the value stored in said post office equipment;

in response to said first data block being valid, transmitting from the post office equipment a second secure data block comprising credit updating data corresponding to the variable value of credit update indicated in the credit updating message and said transaction code value and generating and storing a new transaction code value in the post office equipment;

receiving the second data block from the post office equipment via the communication connection at the first station;

verifying validity of said second secure data block by comparing the transaction code value in the second secure data block with the value stored in the franking meter;

and in response to said second data block being valid, updating the credit value in the credit register and generating and storing the new transaction code value in the franking meter.

* * * * *